US006745342B1

(12) United States Patent
Staudt et al.

(10) Patent No.: US 6,745,342 B1
(45) Date of Patent: Jun. 1, 2004

(54) UNIVERSAL SERIAL BUS TRANSCEIVER SHORTCUT PROTECTION

(75) Inventors: Christian Staudt, Santa Clara, CA (US); Joerg Hartung, Los Gatos, CA (US); Sinork Guellueoglu, San Jose, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/474,423

(22) Filed: Dec. 29, 1999

(51) Int. Cl.[7] ............................................. G06F 11/00
(52) U.S. Cl. ...................................................... 714/25
(58) Field of Search .............................. 361/91.1, 91.3, 361/93.1; 714/25

(56) References Cited

U.S. PATENT DOCUMENTS

| 4,342,065 A | * | 7/1982 | Larson ...................... 361/93.1 |
| 4,453,215 A | | 6/1984 | Reid |
| 4,679,028 A | * | 7/1987 | Wilson et al. ............... 341/120 |
| 5,225,775 A | * | 7/1993 | Sekino ...................... 324/158.1 |
| 5,497,284 A | | 3/1996 | Le Van Suu |
| 5,675,265 A | * | 10/1997 | Yamamori ...................... 327/3 |
| 5,850,159 A | | 12/1998 | Chow et al. |
| 5,986,359 A | * | 11/1999 | Enderich et al. ............. 307/125 |
| 6,262,872 B1 | * | 7/2001 | Messerli et al. ........... 361/93.1 |

FOREIGN PATENT DOCUMENTS

| EP | 0 239 731 A2 | 10/1987 |
| EP | 0 785 649 A2 | 7/1997 |

OTHER PUBLICATIONS

Anonymous, "Data Sensing Cut–Off Scheme," *IBM Technical Disclosure Bulletin*, 1985, 28(3):1262–1263.

* cited by examiner

Primary Examiner—Paul R. Myers
(74) Attorney, Agent, or Firm—Fish & Richardson P.C.

(57) ABSTRACT

A Universal Serial Bus interface including a USB device controller coupled by way of a shortcut protection circuit to a USB transceiver. The shortcut protection circuit compares the driven DPLS and DMNS signals from the USB transceiver with TxDPLS and TxDMNS, the transmitted signals from the USB device controller. If a difference is detected between TxDPLS and DPLS, or between TxDMNS and DMNS, the transmission is disabled.

13 Claims, 3 Drawing Sheets

UNIVERSAL SERIAL BUS TRANSCEIVER SHORTCUT PROTECTION

RESERVATION OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records available to the public, but otherwise reserves all copyright rights whatsoever.

BACKGROUND OF THE INVENTION

1. Field of the Invention

The present invention relates to bus interfaces, and in particular, to a system and method for providing short circuit protection for a Universal Serial Bus (USB) interface.

2. Description of the Related Art

The Universal Serial Bus (USB) is a bi-directional, isochronous, dynamically attachable serial interface providing two wire point to point signaling. Signals are differentially driven at a bit rate of 12 megabits per second.

An exemplary Universal Serial Bus interface is shown in FIG. 1. As shown, the interface includes a USB transceiver 102, typically embodied as an integrated circuit. At least four contacts are provided at a chip boundary 104. These are VDD (5 V) 106, VSS (0 V) 112, and the data ports DPLS 108 and DMNS 110 (0–3.3 V).

A short circuit of DPLS or DMNS to VDD or VSS while the bus is being driven could damage the transceiver. Accordingly, the Universal Serial Bus Specification Version 1.1 requires that the transceiver connected to DPLS and DMNS must resist a short circuit of DPLS and DMNS to VDD or VSS.

SUMMARY OF THE INVENTION

These and other drawbacks in the prior art are overcome in large part by transceiver shortcut protection according to the present invention. A Universal Serial Bus interface according to one implementation includes a USB device controller coupled by way of a shortcut protection circuit to a USB transceiver. The shortcut protection circuit compares the driven DPLS and DMNS signals from the USB transceiver with TxDPLS and TxDMNS, the transmitted signals from the USB device controller. If a difference is detected between TxDPLS and DPLS, or between TxDMNS and DMNS, the transmission is disabled.

A shortcut protection unit according to one implementation includes a comparison circuit and a disable circuit. The comparison circuit is embodied as a state machine for periodically comparing the TxDPLS and DPLS signals, and the TxDMNS and DMNS signals. If different signal levels are detected, then the state machine provides an output to the disable circuit. In turn, the disable circuit turns off the USB transceiver's transmit enable.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 2–5 illustrate an improved system and method for shortcut protection for a Universal Serial Bus (USB) interface. A Universal Serial Bus interface according to one implementation includes a USB device controller coupled by way of a shortcut protection circuit to a USB transceiver. The shortcut protection circuit compares the driven DPLS and DMNS signals from the USB transceiver with TxDPLS and TxDMNS, the transmitted signals from the USB device controller. If a difference is detected between TxDPLS and DPLS, or between TxDMNS and DMNS, the transmission is disabled.

Figure 1:
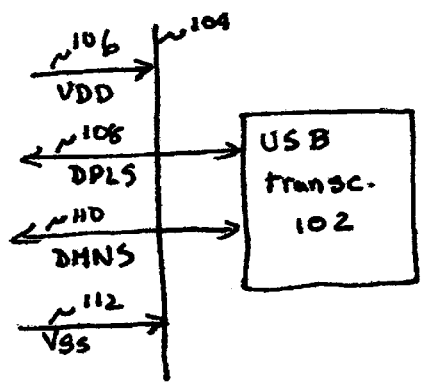
FIG. 1 is a block diagram of a Universal Serial Bus interface according to the prior art.
Figure 2:
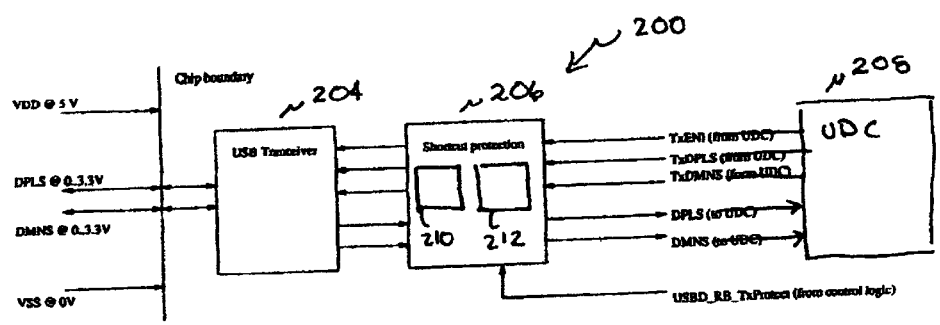
FIG. 2 is a block diagram of a Universal Serial Bus interface having shortcut protection according to an implementation of the present invention.

Turning now to FIG. 2, a Universal Serial Bus interface 200 employing shortcut protection according to an implementation of the invention is shown. The USB interface 200 includes a USB transceiver 204 for receiving the USB DPLS and DMNS signals. The USB transceiver 204 may be Infineon Part No. mP105f 3v3. A shortcut protection circuit 204 is coupled to the USB transceiver 204. As will be described in greater detail below, the shortcut protection circuit 206 may include a comparison circuit 210 and a disable circuit 212. The shortcut protection circuit 206 couples the USB transceiver 204 to a Universal Serial Bus device controller (UDC) 208. The UDC 208 may be the UDC Revision 2.0, available from Phoenix Microelectronics. The shortcut protection circuit 206 provides the driven DPLS and DMNS signals to the UDC 208. The shortcut protection circuit 206 receives a transmit enable (TxENI), and the transmit TxDPLS and TxDMNS signals from the UDC 208. Further, the shortcut protection circuit 206 receives a USBD_RB_TxProtect signal from system control logic, as will be explained in greater detail below.

Figure 3:
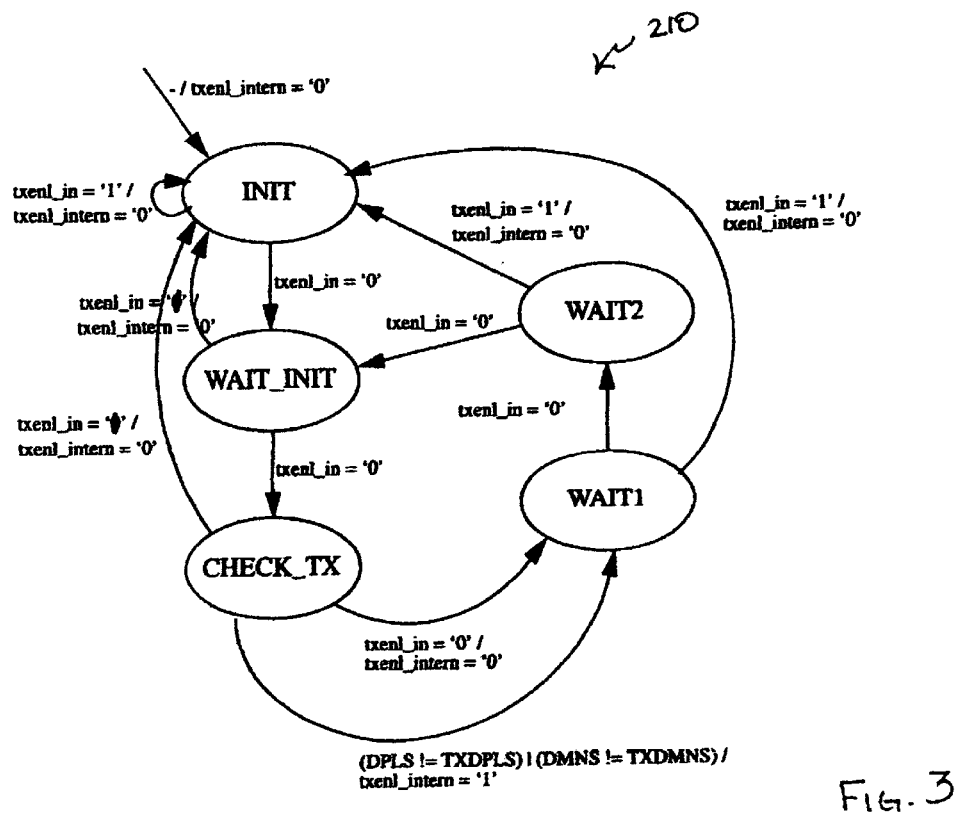
FIG. 3 is a diagram of a state machine implementing a comparison circuit according to an implementation of the present invention.

Turning now to FIG. 3, a state diagram of a state machine embodying the comparison circuit is shown in greater detail. As will be explained in greater detail below, five states, INIT, WAIT_INIT, CHECK_TX, WAIT2, and WAIT1, and two signals, TxENI_in and TxENI_intern are defined. The TxENI_in is a transfer or transmit enable signal coming from the UDC 208. The TxENI_intern is the disable signal of the state machine which is input to the disable circuit. It is noted, however, that while described in context of separate comparison and disable circuits, the state machine's or the comparison circuit's disable signal may be used to disable transmission directly, without a separate disable circuit. Thus, the figures are exemplary only.

As illustrated, the state machine 210 runs at 48 MHz. An initial comparison of the TxDPLS and DPLS and the TxDMNS and DMNS signals is made three clock cycles after transmission has begun and, thereafter, every four clock cycles. In particular, the USB Specification requires that the propagation time through the cable be not more than 26 ns. Thus, after 52 ns the driven signal must be propagated back through the transceiver and be available to be compared to the actual driven signal.

Figure 5:
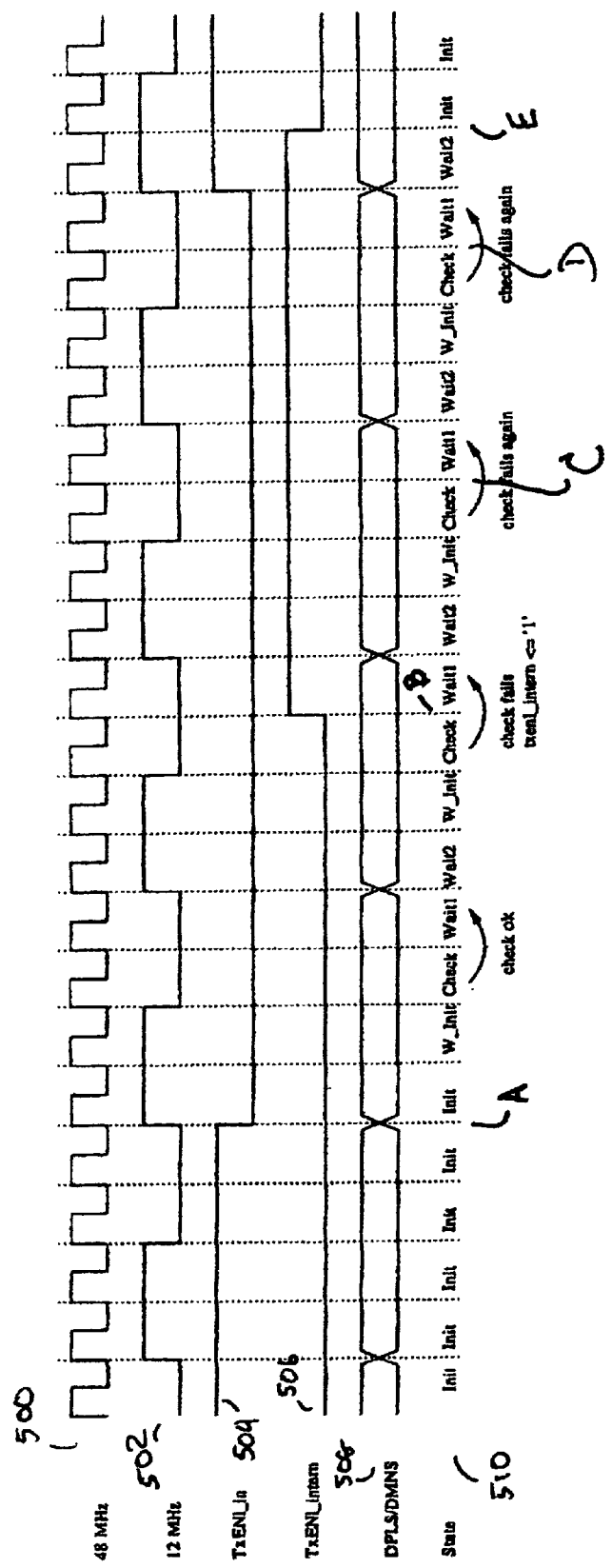
FIG. 5 is a timing diagram according to an implementation of the present invention.

Operation of the invention is described with reference to the state diagram of FIG. 3 and the timing diagram of FIG. 5. The timing diagram of FIG. 5 illustrates the 48 MHz state machine clock 500, the 12 MHz USB clock 502, the TxENI_in signal 504, TxENI_intern signal 506, DPLS/DPMNS signals 508, and corresponding states 510.

As shown, initially TxENI_intern is low, and TxENI_in is high, and the system is in state INIT. At time A (FIG. 5), TxENI_in goes low, enabling a USB transaction. A clock cycle later, state WAIT_INIT is entered. The next clock cycle, i.e., the third clock cycle after transmit has been enabled, a check (state CHECK_TX) is performed. That is, DPLS is compared to TXDPLS and DMNS is compared to TxDMNS. As shown in FIG. 5, if the check passes, TxENI_intern is maintained low. In either case, the state machine cycles to state WAIT1. If TxENI_in stays active low, i.e., a transmission is still occurring, then the system proceeds on the next clock to state WAIT2. If transmissions are still occurring on the next clock, i.e., the third clock cycle after the previous check, WAIT_INIT is reached. The next clock, the system performs the check again (state CHECK_TX). As shown in FIG. 5, this time, the check fails and on the next clock, TxENI_intern goes active (time B). The system then cycles again through WAIT1, WAIT2, WAIT_INIT and CHECK_TX again, to perform the check every four clock cycles. Once the check has failed, the check will continue to fail. Thus, as shown in FIG. 5, at time C and time D, TxENI_intern stays active. In all states, if TxENI_in goes high, indicating that transmission has stopped, the system returns to state INIT (time E).

In certain instances, it may be desirable to disable the transceiver protection circuit according to the present invention. One implementation of such a disable circuit according to the present invention is shown in greater detail with reference to FIG. 4. As illustrated, the disable circuit 212 includes an AND gate 404 for receiving the TxENI_intern signal from the comparison circuit 210, as well as a USBD_RB_TXPROTECT signal from the system software. The output of the AND gate 404 is provided to an OR gate 402, which also receives the TXENI_in signal from the UDC. The OR gate 402 provides a master TXENI_Out signal to the USB transceiver 204.

Figure 4:
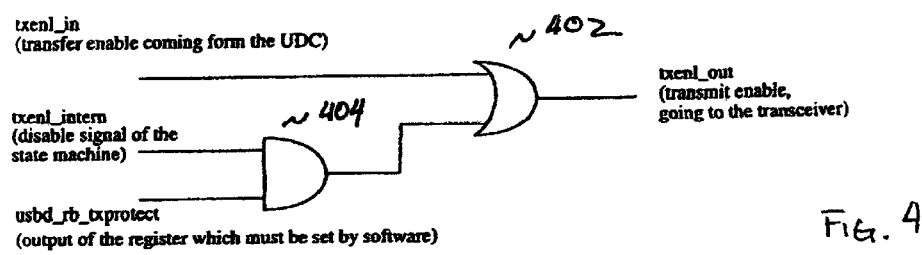
FIG. 4 is a diagram of a disable circuit according to an implementation of the present invention.

So long as the USBD_TXPROTECT bit is low, the output of the AND gate 404 is low, and the TX_ENL_INTERN signal does not have an effect on the TXENL_OUT signal. The output of the AND gate 404 is low and the TXENI_IN from the UDC is forwarded to the TXENI_OUT without any transceiver protection. It is noted that the disable circuit 212 may take forms other than that specifically illustrated. Thus, FIG. 4 is exemplary only.

APPENDIX

```
--#-------------------------------------------------------------------
--# File name=            usbblk_txprotect-e.vhd
--# CCASE_USER=           "inserted automatically at check-in"
--# CCASE_VERSION=        "inserted automatically at check-in"
--# CCASE_DATE=           "inserted automatically at check-in"
--# CCASE_HWPROJECT=      "inserted automatically at check-in"
--# Comments=
--#
--# Copyright © SIEMENS AG 1999 all rights reserved
--#-------------------------------------------------------------------
library ieee;
use ieee.std_logic_1164.all;
entity usbblk_txprotect is
    port (
        txenl_out           : out    std_ulogic;     -- modified output disable
                                                     -- (going to the transciver, low active)
        dpls                : in     std_ulogic;     -- dpls and dmns as inout signals from pads
        dmns                : in     std_ulogic;
        txdpls              : in     std_ulogic;     -- dpls and dmns to output coming from UDC
        txdmns              : in     std_ulogic;
        txenl_in            : in     std_ulogic;     -- transfer enable (low active) coming from udc
        usbd_rb_txprotect   : in     std_ulogic;     -- protect enable (high active) coming from register
        clk_4x              : in     std_ulogic;
        reset_n             : in     std_ulogic
    );
end usbblk_txprotect;
--#-------------------------------------------------------------------
--# File name=            usbblk_txprotect-rtl-a.vhd
--# CCASE_USER=           "inserted automatically at check-in"
--# CCASE_VERSION=        "inserted automatically at check-in"
--# CCASE_DATE=           "inserted automatically at check-in"
--# CCASE_HWPROJECT=      "inserted automatically at check-in"
--# Comments=
--#
--# Copyright © SIEMENS AG 1999 all rights reserved
--#-------------------------------------------------------------------
use work.usbd_constants.all;
architecture rtl of usbblk_txprotect is
    -- transfer disable state machine
    constant    TXDIS_INIT         : std_logic_vector(2 downto 0) := "000";
    constant    TXDIS_WAIT_INIT    : std_logic_vector(2 downto 0) :=
```

APPENDIX-continued

```
"001";
    constant    TXDIS_CHECK_TX        : std_logic_vector(2 downto 0) :=
"010";
    constant    TXDIS_WAIT1           : std_logic_vector(2 downto 0) :=
"011";
    constant    TXDIS_WAIT2           : std_logic_vector(2 downto 0) :=
"100";
    constant    TXDIS_WAIT3           : std_logic_vector(2 downto 0) :=
"101";
    signal txdis_cur_state            : std logic_vector(2 downto 0);
    signal txenl_intern               : std_logic;
begin -- rtl
    -- ---------------------------
    -- combo block
    -- ---------------------------
    blk_txdis_combo: block
    begin -- {
        txenl_out <= txenl_in or
                     (txenl_intern and
                     usbd_rb_txprotect);
    end block blk_txdis_combo; --}
    --
++++++++++++++++++++++++++++++++++++++++++++++++++++++++++++++++++++
    -- Transfer (signal txenl) disable state machine - checks the value
    -- of DPLS and DMNS against TXDPLS and TXDMNS in case that our
device
-- is driving the USB. If Signals differ, transmit enable is
-- turned off
--------------------------------------------------------------------
--
    proc_txdis: process(clk_4x, reset_n)
    begin
        if (reset_n = LO) then
            txdis_cur_state    <= TXDIS_INIT;
            txenl_intern       <= LO;
        elsif (clk_4x'event and clk_4x = HI) then
            case txdis_cur_state is
                -- waiting for start of transfer (default: enabled)
                when TXDIS_INIT =>
                    txenl_intern <= LO;
                    if (txenl_in = LO) then
                        txdis_cur_state <= TXDIS_WAIT_INIT;
                    end if;
                -- waiting one clock cycle before checking the value
                when TXDIS_WAIT_INIT =>
                    if (txenl_in = HI) then
                        -- transfer over -> to idle state
                        txdis_cur_state   <= TXDIS_INIT;
                        txenl_intern      <= LO;
                    else
                        -- still transfering -> to check state
                        txdis_cur_state <= TXDIS_CHECK_TX;
                    end if;
                -- checking datalines
                when TXDIS_CHECK_TX =>
                    if (txenl_in = HI) then
                        -- transfer over -> to idle state
                        txenl_intern      <= LO;
                        txdis_cur_state   <= TXDIS_INIT;
                    elsif ( (DPLS /= TXDPLS) or
                            (DMNS /= TXDMNS)) then
                        -- check failed
                        txenl_intern <= HI;
                    end if;
                    txdis_cur_state <= TXDIS_WAIT1;
                -- wait for first time
                when TXDIS_WAIT1 =>
                    if (txenl_in = HI) then
                        -- transfer over -> to idle state
                        txenl_intern      <= LO;
                        txdis_cur_state   <= TXDIS_INIT;
                    else
                        txdis_cur_state <= TXDIS_WAIT2;
                    end if;
                -- wait for second time
                when TXDIS_WAIT2 =>
                    if (txenl_in = HI) then
                        -- transfer over -> to idle state
                        txenl_intern      <= LO;
```

APPENDIX-continued

```
            txdis_cur_state    <= TXDIS_INIT;
        else
            txdis_cur_state <= TXDIS_WAIT_INIT;
        end if;
      when others =>
        txenl_intern       <= LO;
        txdis_cur_state    <= TXDIS_INIT;
      end case;
    end if;
  end process;
end rtl; -- of usbblk_txprotect
```

What is claimed is:

1. A transceiver protection circuit, comprising:

a comparison circuit configured to detect a short circuit to one or more predetermined voltage sources by comparing a drive signal and a transmit signal of a bus transceiver running at a bus clock, the comparison circuit including a state machine running at a state machine clock that is faster than the bus clock, the state machine configured to delay a first comparison of the drive and transmit signals by a predetermined number of state machine clock cycles after initialization of the drive signal, the delay matching or exceeding a maximum back propagation time of the drive signal.

2. The transceiver protection circuit of claim 1, wherein the comparison circuit is configured to generate a drive disable signal if a short circuit is detected.

3. The transceiver protection circuit of claim 1, wherein the comparison circuit receives a transmit enable signal indicating initialization of the drive signal.

4. The transceiver protection circuit of claim 1, the comparison circuit configured to receive a protection disable signal to disable the transceiver protection circuit.

5. A transceiver protection circuit in accordance with claim 1, said comparison circuit configured to perform subsequent comparisons periodically after said first comparison on a period a predetermined number of state machine clock cycles greater than said predetermined number of state machine clock cycles after initialization of the drive signal.

6. A transceiver protection circuit in accordance with claim 2, including a disable circuit for disabling said bus transceiver if the drive disable signal generated by the comparison circuit indicates that a short circuit is detected.

7. A transceiver protection circuit in accordance with claim 6, wherein said drive signal and transmit signal are Universal Serial Bus (USB) signals.

8. A bus interface, comprising:

a bus transceiver circuit running at bus clock; and a transceiver protection circuit, said transceiver protection circuit including a comparison circuit for detecting a short circuit to one or more voltages by comparing a drive signal and a transmit signal of the bus transceiver circuit, the comparison circuit including a state machine running at a state machine clock that is faster than the bus clock, the state machine configured to delay a first comparison of the drive and transmit signals by a predetermined number of state machine clock cycles after initialization of the drive signal, the delay matching or exceeding a maximum back propagation time of the drive signal.

9. A bus interface according to claim 8, including a disable circuit for disabling said transceiver when said short circuit is detected.

10. A bus interface according to claim 9, wherein said drive signal and transmit signal are Universal Serial Bus (USB) signals.

11. A transceiver protection circuit in accordance with claim 8, said comparison circuit configured to perform subsequent comparisons periodically after said first comparison on a period a predetermined number of state machine clock cycles greater than said predetermined number of state machine clock cycles after initialization of the drive signal.

12. A method for protecting a transceiver from short circuits, comprising:

comparing a drive signal with a transmit signal of a bus transceiver running at a bus clock;

using a state machine running at a state machine clock that is faster than the bus clock to delay a first comparison of the drive and transmit signals by a predetermined number of state machine clock cycles after initialization of the drive signal, the delay matching or exceeding a maximum back propagation time of the drive signal; and generating a disable signal to disable the transceiver if said drive signal and said transmit signal are not substantially identical.

13. A method according to claim 12, further comprising:

periodically comparing the drive and transmit signals after the first comparison on a period that is a number of state machine clock cycles greater than the predetermined number of state machine clock cycles after initialization of the drive signal.

* * * * *